United States Patent
Geliot et al.

(10) Patent No.: US 11,066,992 B2
(45) Date of Patent: Jul. 20, 2021

(54) AIRCRAFT PROPULSION ASSEMBLY COMPRISING A COLD BLEED AIR INTAKE DEVICE WITH VARIABLE AERODYNAMIC PROFILE

(71) Applicant: Airbus Operations SAS, Toulouse (FR)

(72) Inventors: Jean Geliot, Toulouse (FR); Adeline Soulie, Verdun sur Garonne (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 222 days.

(21) Appl. No.: 16/394,339

(22) Filed: Apr. 25, 2019

(65) Prior Publication Data

US 2019/0338704 A1    Nov. 7, 2019

(30) Foreign Application Priority Data

May 3, 2018  (FR) ...................................... 1853823

(51) Int. Cl.
*B64D 33/02* (2006.01)
*F02C 6/08* (2006.01)
(Continued)

(52) U.S. Cl.
CPC ................ *F02C 6/08* (2013.01); *B64D 33/02* (2013.01); *F02C 7/141* (2013.01); *F02C 9/18* (2013.01);
(Continued)

(58) Field of Classification Search
CPC ...... B64D 2033/024; B64D 2033/0286; B64D 33/08; B64D 2033/02; B64D 2033/0226; F02C 7/14; F02C 7/141
See application file for complete search history.

(56) References Cited

U.S. PATENT DOCUMENTS

| 4,418,879 A * | 12/1983 | Vanderleest | ........... B64D 33/02 137/15.1 |
| 7,014,144 B2 * | 3/2006 | Hein | ...................... B64D 33/02 244/53 B |

(Continued)

FOREIGN PATENT DOCUMENTS

| EP | 2208669 A2 | 7/2010 |
| EP | 3115588 A1 | 1/2017 |

(Continued)

OTHER PUBLICATIONS

French Search Report; priority document.

*Primary Examiner* — Todd E Manahan
*Assistant Examiner* — Thuyhang N Nguyen
(74) *Attorney, Agent, or Firm* — Greer, Burns & Crain, Ltd.

(57) ABSTRACT

A propulsion assembly for an aircraft comprising a pylon and a bypass turbomachine having a fan duct in which an air flow flows. The turbomachine further comprises an air intake system with a cold bleed air device for bleeding some of the air flow from the fan duct, the device comprising a sliding scoop comprising an upstream face that is open to allow the air to pass and a lower side that has an air outlet opening connected to an exchanger. The scoop is able to slide between an open position in which the scoop extends at least in part into the fan duct and in which part of the air flow in the fan duct rushes into the scoop via the upstream face thereof, and a closed position in which the scoop does not extend into the fan duct and has its upper side closing off the cutout.

9 Claims, 8 Drawing Sheets

(51) Int. Cl.
*F02C 9/18* (2006.01)
*F02C 7/141* (2006.01)

(52) U.S. Cl.
CPC .. *B64D 2033/0286* (2013.01); *F05D 2250/51* (2013.01)

(56) References Cited

U.S. PATENT DOCUMENTS

| | | | |
|---|---|---|---|
| 10,569,893 B2 * | 2/2020 | Tretow | ................... B64D 41/00 |
| 2012/0280088 A1 | 11/2012 | Sakurai et al. | |
| 2017/0009657 A1 | 1/2017 | Schwarz et al. | |

FOREIGN PATENT DOCUMENTS

| | | |
|---|---|---|
| FR | 3028289 B1 | 8/2017 |
| WO | 8202181 A1 | 7/1982 |

\* cited by examiner

AIRCRAFT PROPULSION ASSEMBLY COMPRISING A COLD BLEED AIR INTAKE DEVICE WITH VARIABLE AERODYNAMIC PROFILE

CROSS-REFERENCES TO RELATED APPLICATIONS

This application claims the benefit of the French patent application No. 1853823 filed on May 3, 2018, the entire disclosures of which are incorporated herein by way of reference.

FIELD OF THE INVENTION

The invention relates to an aircraft propulsion assembly comprising a cold bleed air device with a variable aerodynamic profile for bleeding air from the fan duct.

BACKGROUND OF THE INVENTION

A bypass turbomachine generally comprises an air intake system for supplying air to the air-using systems of the aircraft such as, for example, the system that renews and regulates the pressure of the cabin air or else the de-icing systems. The air intake system bleeds hot air from the hot parts of the turbomachine and cold air from the fan duct of the turbomachine. In order for the temperature of the air supplied to the aircraft air systems to remain below a temperature limit, the air intake system comprises an exchanger (PCE) in which the cold and hot air flows are mixed.

In the known way, for example as described in application FR3028289, the air from the fan duct is bled by a cold air bleed device fixed to the fan duct in order to intercept part of the flow of air in the fan duct. The cold air bleed device takes the form of a housing, arranged in the fan duct, which comprises a motorized flap so as to regulate the flow rate of air supplied to the exchanger to suit the air requirements of the user systems.

SUMMARY OF THE INVENTION

One of the objectives of the invention is to propose an alternative design to such a cold air bleed device. To this end, the invention relates to a propulsion assembly for an aircraft comprising a pylon intended to be attached under a wing of the aircraft, and a bypass turbomachine, the turbomachine comprising:
  an engine fixed to the pylon and designed to drive the rotation of a fan;
  an annular interduct concentric with the engine;
  a nacelle concentric with the interduct, the interduct and the nacelle between them defining a fan duct in which an air flow flows when the fan is turning;
  two forks connecting the engine to the nacelle and passing across the fan duct;
  an air intake system comprising an air circuit having a cold air bleed device arranged at the level of a cutout made in either the nacelle or the interduct or a fork,
  the cold air bleed device comprising a scoop mounted with the ability to slide in a chassis extending in the continuation of the edges of the cutout and a scoop actuating device, the scoop being able to move between a first position, referred to as open, in which the scoop extends at least in part into the fan duct and in which some of the air flow in the fan duct rushes into the scoop, and a second position, referred to as closed, in which the scoop is confined in the chassis and does not extend into the fan duct.

The air bleed device according to the invention thus works like a scoop with a variable aerodynamic profile tailored to the requirements of the air intake system in order not to needlessly impact on the aerodynamic performance of the turbomachine. In the closed position, the air bleed device generates no significant drag. In the open position, the air bleed device makes it possible to meet the air requirements of the air intake system, notably in cases in which the engine is idling.

BRIEF DESCRIPTION OF THE DRAWINGS

The abovementioned features of the invention, together with others, will become more clearly apparent from reading the following description of exemplary embodiments, the description being given in connection with the attached drawings, among which.

DETAILED DESCRIPTION OF THE PREFERRED EMBODIMENTS

Figure 1:
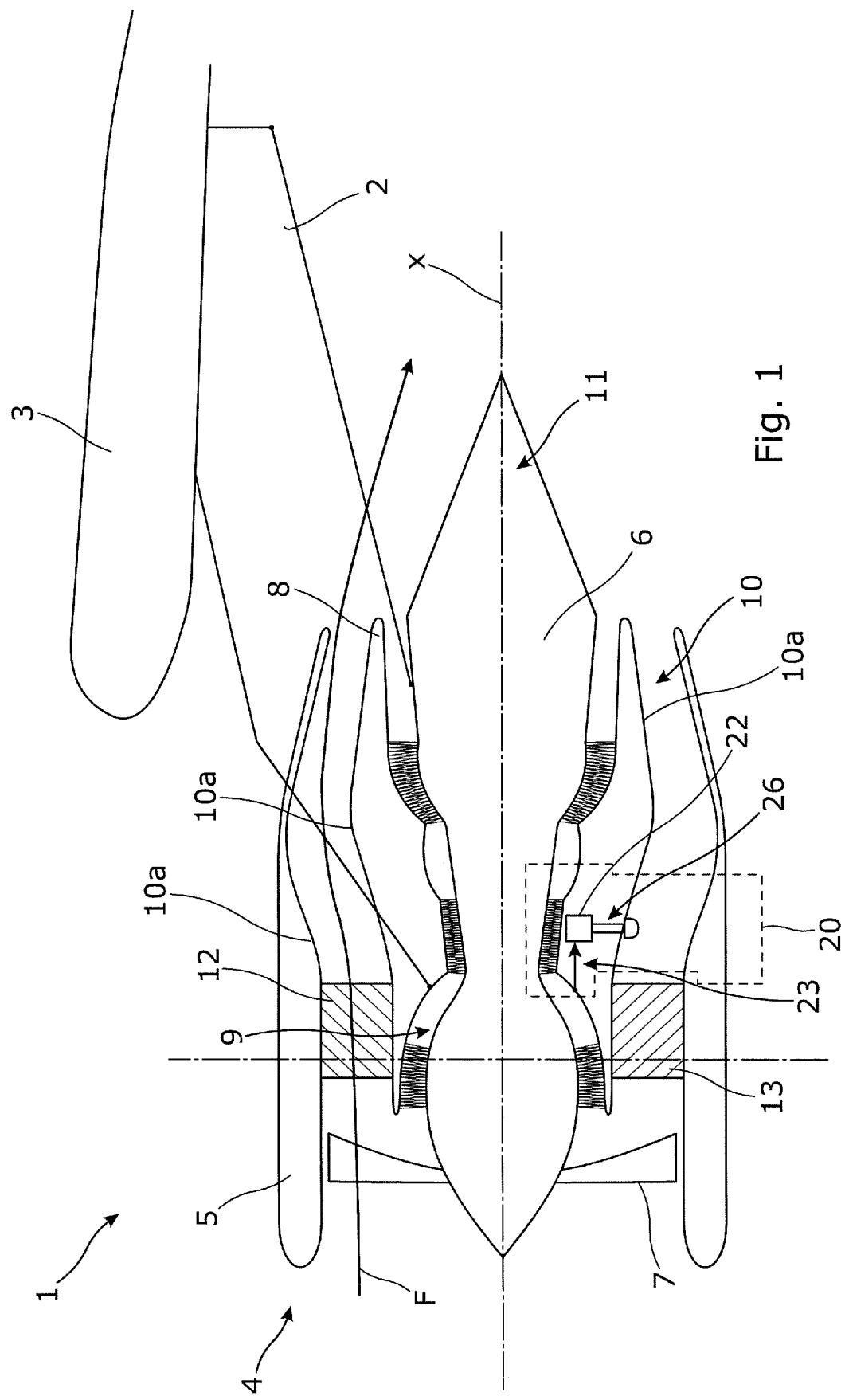
FIG. 1 is a schematic view of an aircraft propulsion assembly viewed in section along its longitudinal axis, the assembly comprising a pylon to which a turbomachine according to one embodiment of the invention is attached.
Figure 2:
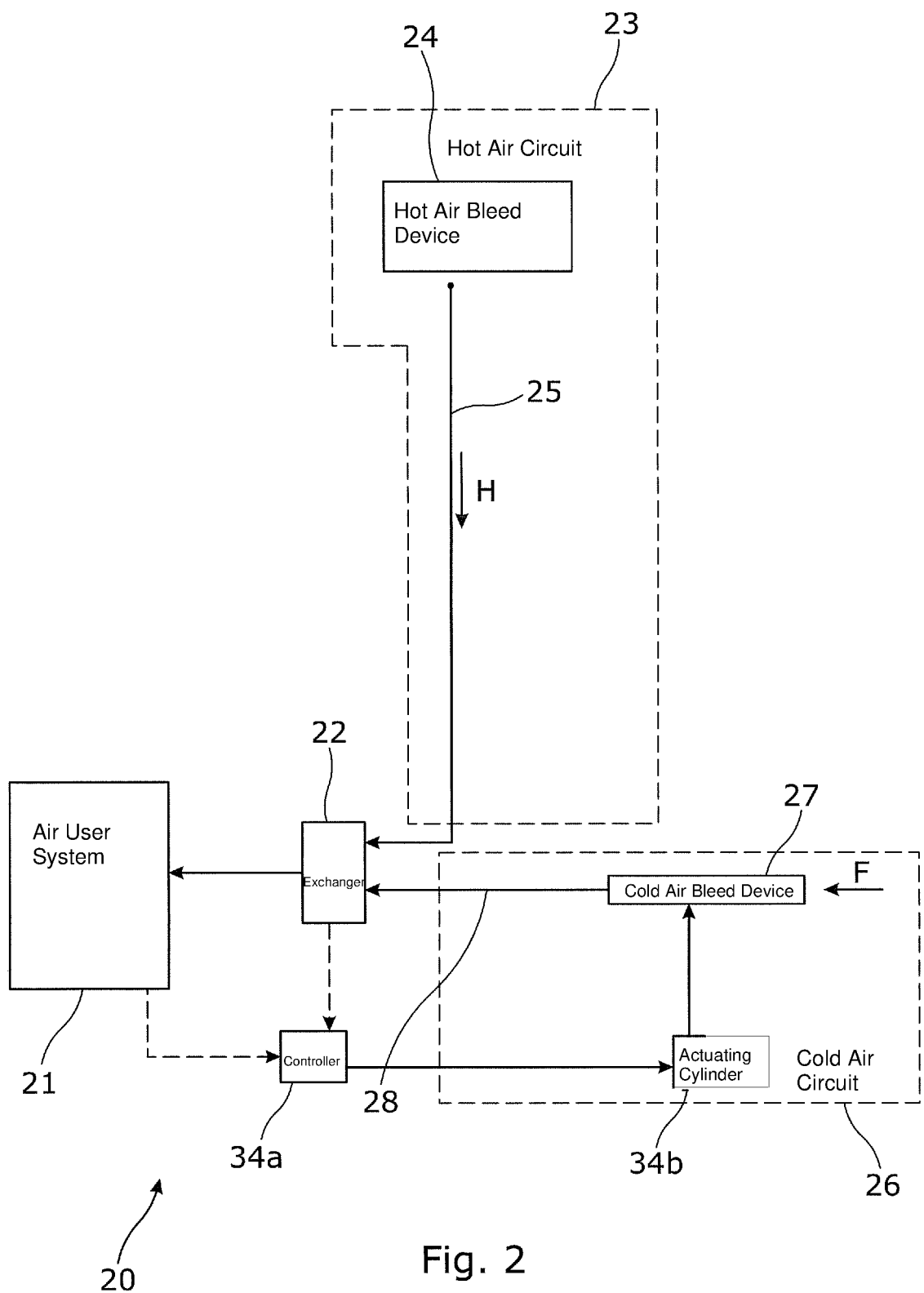
FIG. 2 is a schematic view showing the layout of the various components of the air intake system of the turbomachine of FIG. 1.
Figure 3:
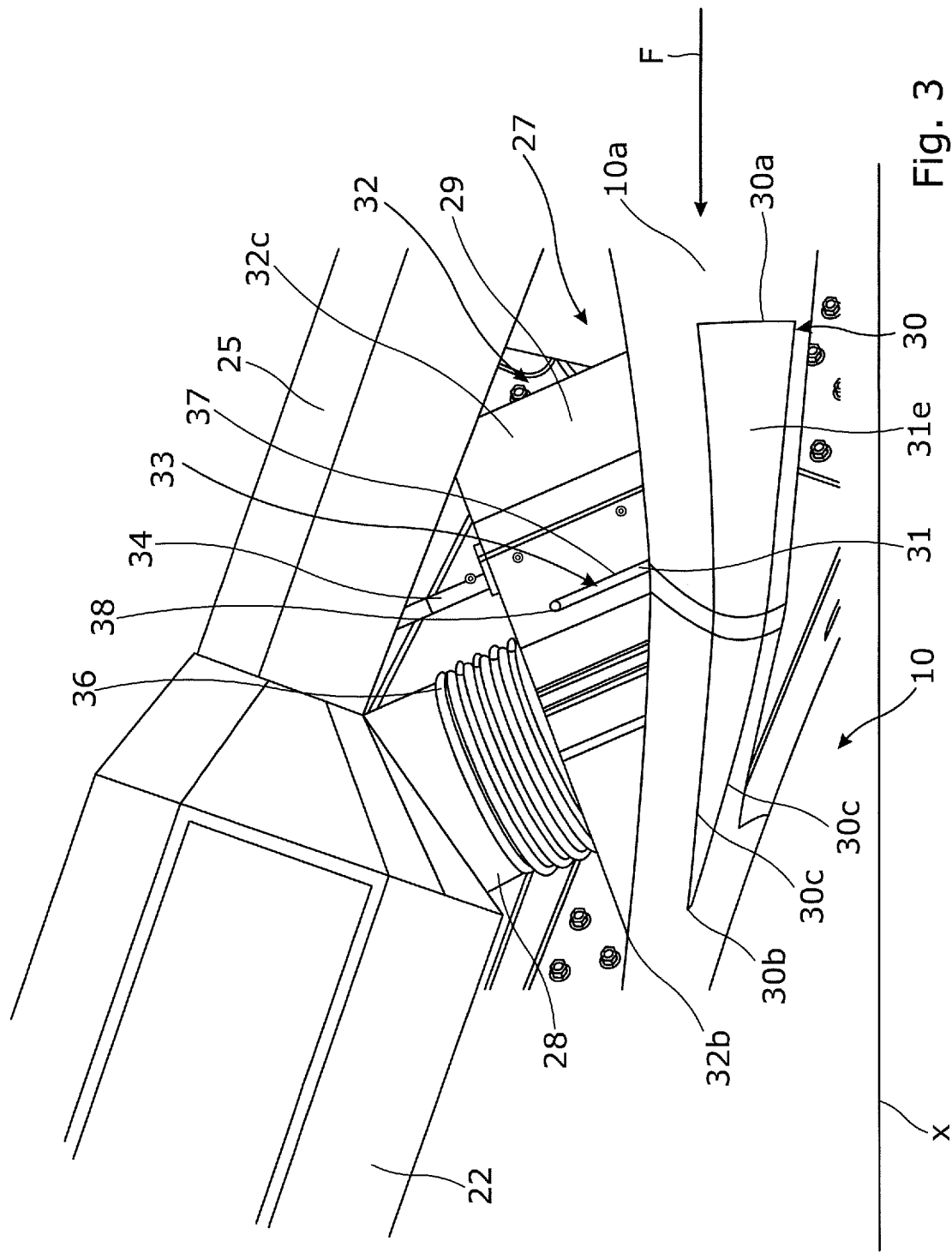
FIG. 3 depicts a view, along the longitudinal axis of the engine assembly, of a cold air bleed device of the air intake system according to one embodiment of the invention.
Figure 4:
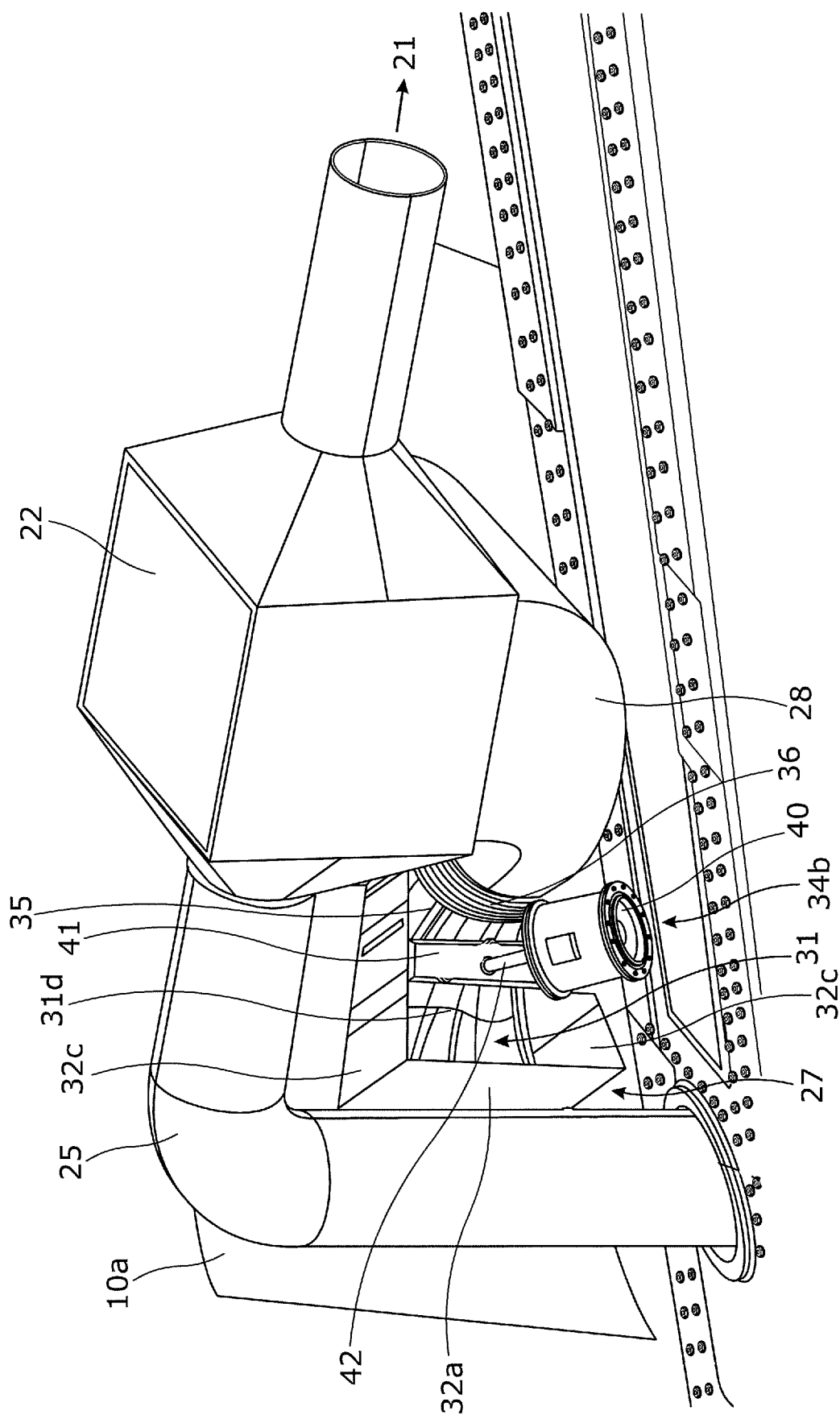
FIG. 4 depicts a perspective view of the cold air bleed device of FIG. 3.
Figure 5A:
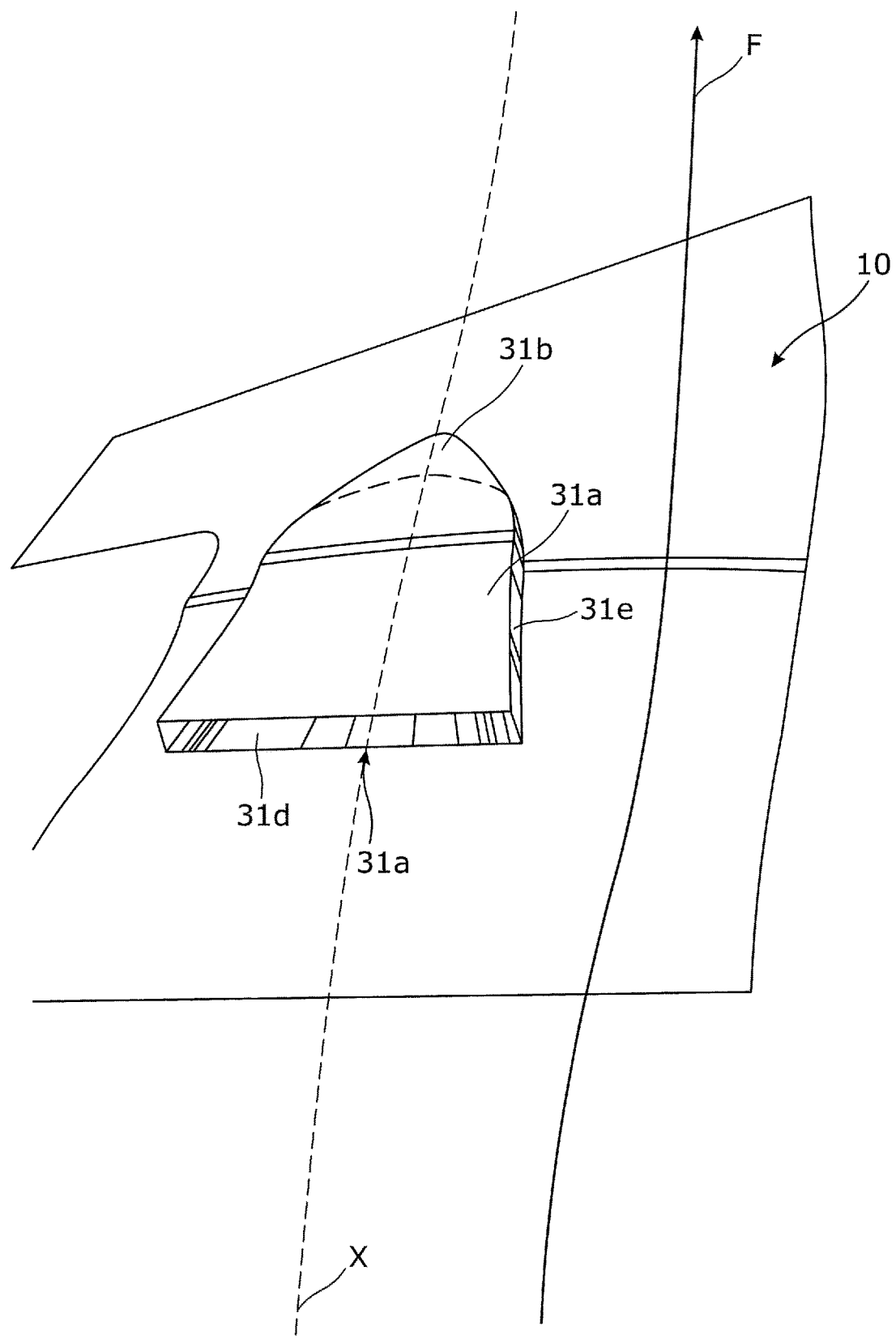
FIGS. 5a and 5b respectively depict, in perspective view, two configurations of the air bleed device of FIG. 4.
Figure 5B:
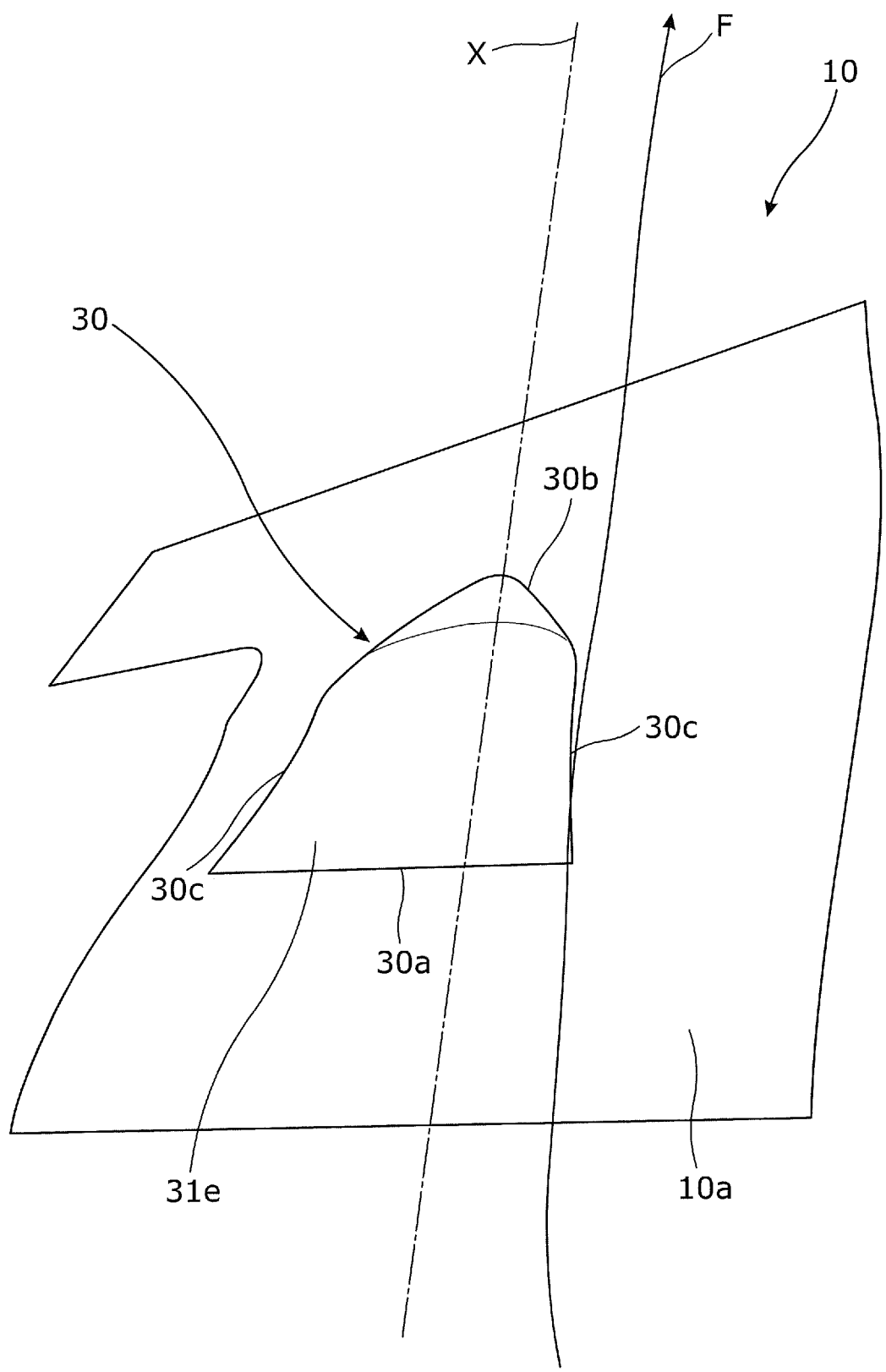

With reference to FIGS. 1 and 2, a propulsion assembly 1 comprises a pylon 2 fixed under the wing 3 of an aircraft and a bypass turbomachine 4. The turbomachine 4 comprises an annular nacelle 5 centered on a longitudinal axis X, which constitutes the external shell of the turbomachine 4 and surrounds an engine 6 fixed to the pylon 2, and a fan 7 driven by the engine 6 when the engine is running.

In the remainder of the description, the terms "upstream" and "downstream" are to be considered in relation to the direction of flow of the air flow passing through the turbomachine 4 and which is produced by the rotation of the fan 7.

The turbomachine 4 additionally comprises, downstream of the fan 7, an annular interduct 8 concentric with the engine 6 and which with the latter delimits an annular flow path 9 for the hot air.

The nacelle 5 surrounds the interduct 8 with which it is concentric. The interduct 8 and the nacelle 5 between them define an annular flow path for the cold air, referred to as the fan duct 10, which receives the majority of the flow of air ejected by the fan 7 as the latter rotates (a minority portion of the air flow enters the hot air flow path 9).

The fan duct 10 extends as far as the jet pipe 11 of the engine 6. The engine 6 is fixed to the nacelle 5 by means of two diametrically opposed forks 12, 13 which provide the turbomachine 1 with mechanical cohesion and notably connect the nacelle 5 and the interduct 8 to one another, passing across the fan duct.

The turbomachine 1 in the known way comprises an air intake system 20 in order to supply one or more air user systems 21 (not depicted in FIG. 1) with air.

The air intake system 20 comprises, arranged, for example, within the thickness of the interduct 8:

an exchanger 22 that mixes a hot air flow H and a cold air flow F which are received at the inlets of the exchanger. An outlet of the exchanger 22 is fluidically connected to at least one air user system 21.

a hot air circuit 23 comprising a hot air bleed device 24 intended to bleed hot air H from the engine 6 (at the compressor stages of the engine for example) and a duct 25 connecting an outlet of the hot air bleed 24 to the exchanger 22 in order to send a flow of hot air H into the inlet of the exchanger 22;

a cold air circuit 26, comprising a cold air bleed device 27 intended to bleed cold air F from the fan duct 10 and a neck 28 connecting an outlet of the cold air bleed 27 to the exchanger 22 in order to send a flow of cold air F into the inlet of the exchanger 22.

With reference to FIGS. 3 to 6, the cold air bleed device 27 is arranged at the level of a cutout 30 made in the interduct 8. The cutout 30 comprises an upstream edge 30a, a downstream edge 30b and lateral edges 30c connecting the upstream and downstream edges and extending overall along the longitudinal axis X. The cutout 30 may adopt various shapes: trapezoidal, parallelepipedal, etc.

According to the invention, the cold air bleed device 27 comprises a scoop 31 (which means to say, a hollow housing) connected to the neck 28 and mounted with the ability to slide in a chassis 32 arranged in the thickness of the interduct and in the extension of the edges 30a-c of the cutout 30, and a sliding mechanism 33 to render the scoop 31 able to move in the chassis 32, and a scoop 31 actuating device 34 to move the scoop with respect to the chassis 32 between an open position P1 (FIG. 5a) in which the scoop 31 extends in part into the fan duct 10, and a closed position P2 (FIG. 5b) in which the scoop 31 does not extend into the duct 30. In the closed position P2, the scoop is confined in the chassis 32 and closes off the cutout 30.

The chassis 32 is hollow and is delimited by an upstream wall 32a extending the upstream edge 30a of the cutout, a downstream wall 32b extending the downstream edge 30b of the cutout, and two lateral walls 32c each extending a lateral edge 30c of the cutout. The chassis 32 is fixed in a fluid tight manner, for example by bonding or screwing, to the edges 30a-c of the cutout 30.

The scoop 31 has a front face 31a which is open to allow air to pass into the scoop, a downstream side 31b and lateral sides 31c, a lower side 31d closing the lower face of the scoop 31 and an upper side 31e closing the upper face of the scoop 31. The upstream face of the scoop 31 is itself open.

The downstream side 31b is situated facing and parallel to the downstream wall 32b of the chassis, the upstream face 31a of the scoop 31 is situated parallel to the upstream wall 32a of the chassis and each lateral wall 31c of the scoop is situated facing and parallel to a lateral side 32c of the chassis. The upstream sides/walls 31a-32a and the downstream sides/walls 31b-32b extend in the thickness of the interduct 8 in a direction overall perpendicular to the wall 10a of the interduct 8 in the region of the cutout 30.

In the closed position P2 (see FIG. 5b), the upper side 31e closes the cutout 30 and lies flush with the wall 10a of the interduct 8 surrounding the cutout 30. Advantageously, the upper side 31e has a shape that complements that of the wall 10a of the interduct 8 at the level of the cutout 30 so as to minimize the drag induced by the scoop 31 in its closed position.

The lower side 31d comprises an opening 35, called the air outlet opening, in the form of an air outlet tube extending out of the scoop in order to direct the air out of this scoop. The air outlet 35 connected to the neck 28 via a gaiter 36. Advantageously, the lower side 31d is profiled with a funnel shape of which the air outlet 35 forms the outlet.

The sliding mechanism 33 comprises, for example, at each lateral side 31c facing a lateral wall 32c, a slot 37 arranged on the lateral wall 32c and at least one peg 38 extending from the lateral side at right angles and which is inserted into the slot 37. The slot 37 extends in a direction roughly perpendicular to the wall 10a at the level of the cutout 30, in a similar way to the downstream sides/walls 31b-32b and upstream sides/walls 31a-32a.

The open position P1 is reached when a peg 38 has reached that end of the slot 37 that is situated closest to the wall 10a of the interduct 8 (which is to say, closest to the fan duct 10) and corresponds to a position of the maximum extension of the scoop 31 out of the chassis 32, whereas the closed position P2, which corresponds to a position of minimum extension of the scoop 31 out of the chassis 32, is reached when a peg 38 has reached that end of the slot 37 that is situated furthest from the fan duct 10.

In the closed position P2, the upstream face 31a is completely covered by the upstream wall 32a of the chassis whereas in the open position, the upstream face 31a is uncovered.

Figure 6:
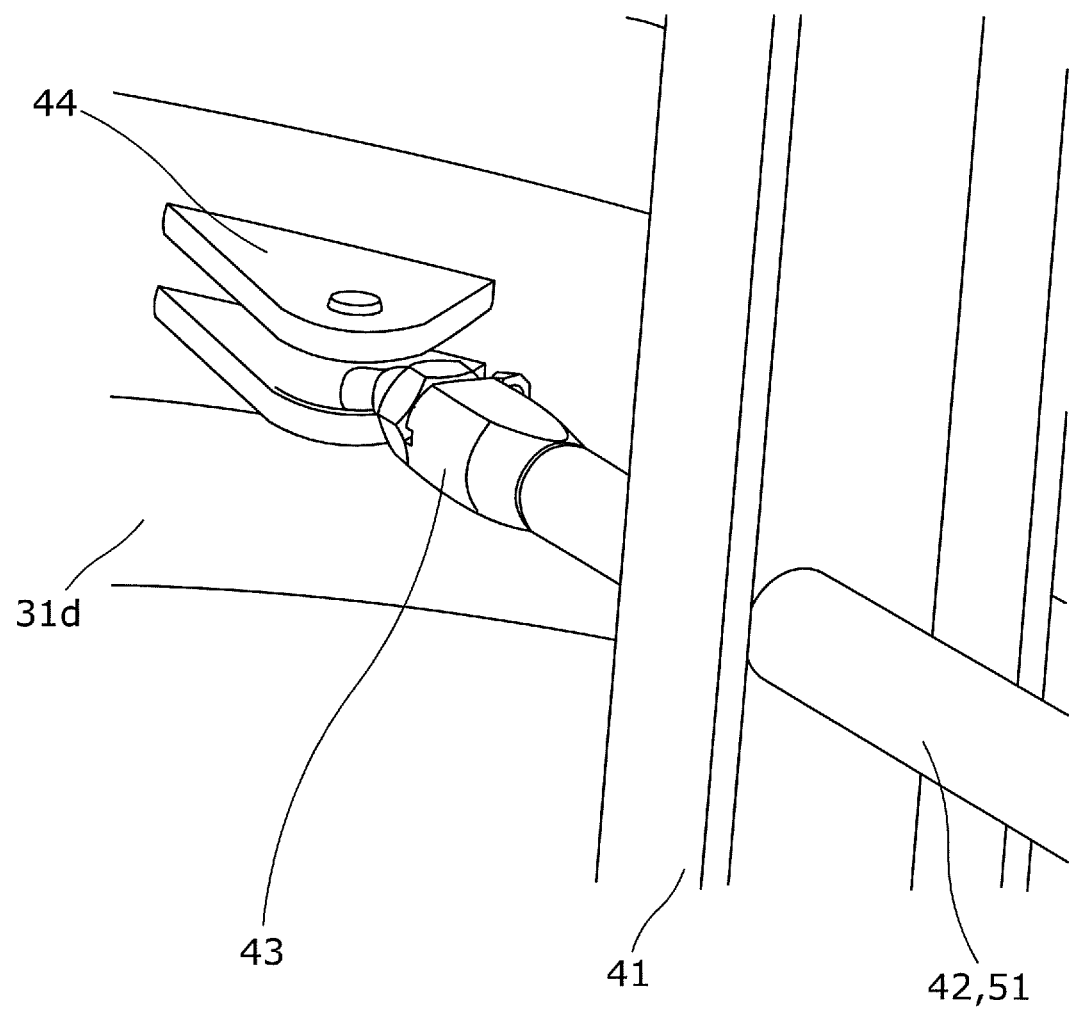
FIG. 6 is a detail of a mechanism that makes it possible to modify the configuration of the cold air bleed device according to one embodiment of the invention.

The actuating device 34 comprises a controller 34a (depicted only in FIG. 2) of the central unit type, and an actuating cylinder 34b comprising an actuating body 40 fixed via a support 41 to the chassis 32, a rod 42 mechanically coupled to the actuating body 40 and extending toward the scoop 31 in a direction roughly perpendicular to the direction of the air flow F in the fan duct 10. The end 43 of the rod 42 is pivot-mounted, via any suitable mechanism (for example: connecting rod as illustrated in FIG. 6) to an attachment flange 44 mounted on the lower side 31d of the scoop 31 so that the translational movement of the rod 42 by the actuating body 40 moves the scoop 31 in the chassis 32.

When the turbomachine 1 is brought into operation, the operation of the cold air bleed device 27, as described hereinabove, is as follows: air is admitted into the turbomachine via the fan 7. Downstream of the fan 7, a cold air flow F flows in the fan duct 10.

Depending on a temperature setting for the air required by a user system 21, the controller 34a operates the actuating cylinder 34b to cause it to move the scoop 31 into one of the following positions:

the open position P1 (FIG. 5a) adopted to achieve maximum bleed of cold air F in extreme operating conditions of the air intake system 20 which occur when the demand from the air user systems 21 is high and combined with a low engine speed. In this position P1, the cold air F rushes into the scoop 31 via the upstream face 31a thereof and escapes from the scoop 31 via the air outlet 35.

The closed position P2 (FIG. 5b) in which no fluid is bled, and the drag induced by the cold air bleed device 27 is minimal An intermediate position PI (FIG. 5a) somewhere between the open position P1 and the closed position P2 in which the upstream face 31a is partially covered by the upstream wall 32a of the chassis so that cold air F can rush into it. Such an intermediate position PI is suitable for most engine speeds (for example cruising speed) of the turbomachine 4 to achieve a partial bleed of fluid with the upstream face 31a being uncovered to a greater or lesser extent according to the flow rate required.

The advantage of the invention is that the cold air bleed device 27 works like a mobile scoop having an aerodynamic profile that is variable and tailored to suit the requirements of the user systems 21 so as not to needlessly impact on the aerodynamic performance of the turbomachine 4, particularly at cruising engine speed. Thus, in the case of normal operation of the cold air bleed device 27, in which the scoop 31 is in the intermediate position PI or in the closed position P2, the drag induced by the scoop 31 is respectively limited or nil compared with the case in which the scoop 31 is in the position P1.

For preference, the upper side 31e and the lateral sides 31c of the scoop are aerodynamically profiled and each have, in succession in the direction of the air flow F, a leading edge and a trailing edge. This arrangement makes it possible to limit still further the drag induced by the scoop 31.

Figure 7:
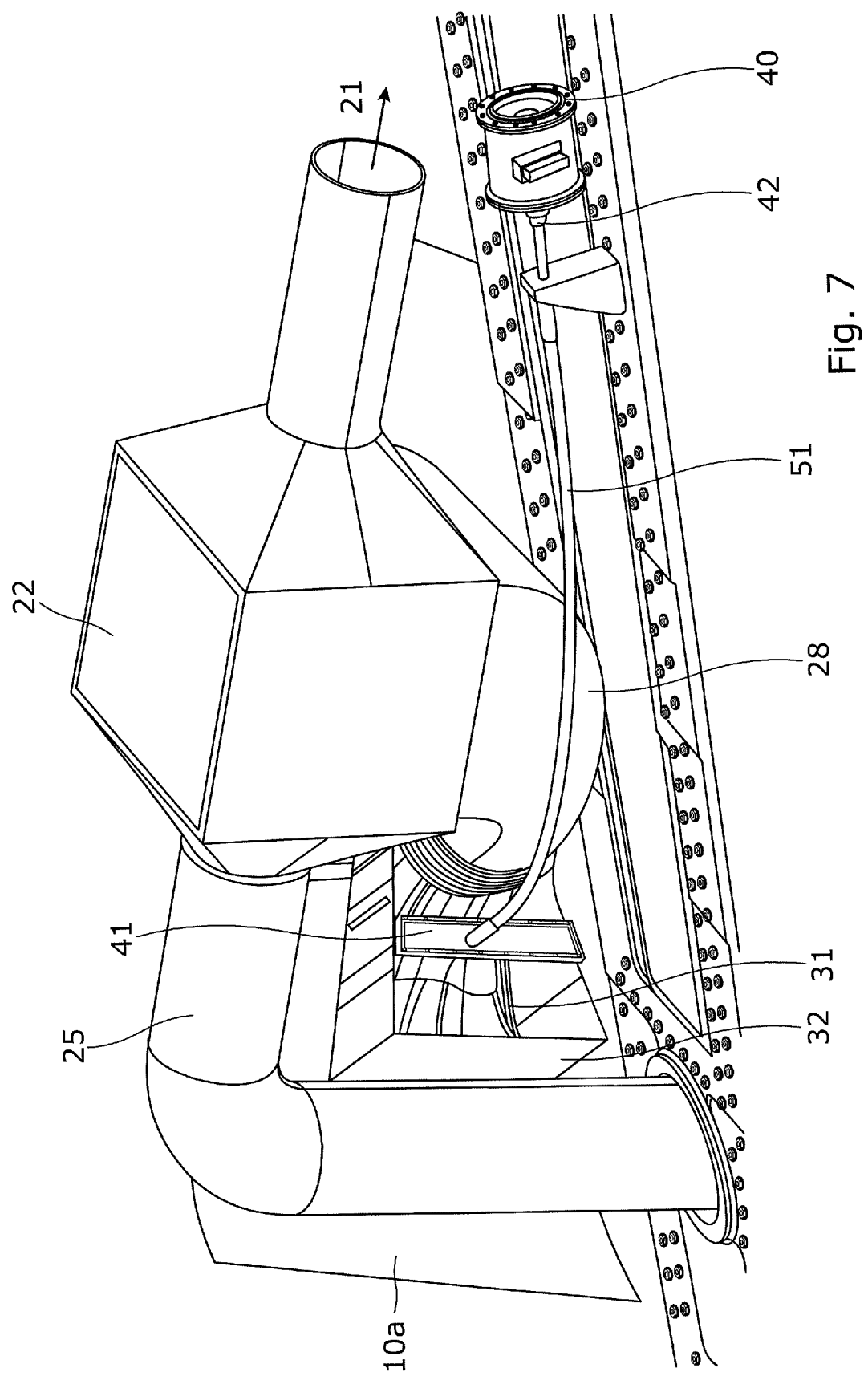
FIG. 7 depicts a perspective view of a cold air bleed device of the air intake system according to another embodiment of the invention.

In one embodiment of the invention, and with reference to FIG. 7, the actuating body 40 of the actuating cylinder 34b is offset from the cold air bleed device 27 and fixed to a fixed part of the turbomachine 4. The rod 42 of the actuating cylinder is fixed to a flexible cable attached pivotwise at its free end to a flange mounted on the lower side 31a of the scoop (mechanism identical to that depicted in FIG. 6). The cable is run through a sheath 51 which is fixed at various points to the fixed structure of the turbomachine and which is also fixed to the chassis via a support component 41.

A movement of the rod 42 causes the cable, guided in the sheath 51, to move and ultimately causes the scoop 31 to move with respect to the chassis 32.

Furthermore, and although in the preceding example it was described that the exchanger 22 and the cold air circuit 26 are arranged in the thickness of the interduct 8, these elements may equally, and without departing from the scope of the present invention, be arranged at various locations on the propulsion assembly 1. Thus, for example, the cold air circuit 120 may be arranged in the thickness of the nacelle 5 (in which case, the cutout is made in the nacelle), or else in one of the forks 12, 13 (in which case the cutout is made in the fork).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion assembly for an aircraft comprising a pylon configured to attach under a wing of the aircraft, and a bypass turbomachine, said turbomachine comprising:
   an engine fixed to the pylon and configured to drive a rotation of a fan;
   an annular interduct concentric with the engine;
   a nacelle concentric with the interduct, the interduct and the nacelle between them defining a fan duct in which an air flow flows when the fan is turning;
   two forks connecting the engine to the nacelle and passing across the fan duct;
   an air intake system comprising an air circuit having a cold air bleed device arranged at a level of a cutout made in either the nacelle or the interduct or one of the two forks,
   the cold air bleed device comprising a scoop mounted with an ability to slide in a chassis extending in a continuation of edges of the cutout and a scoop actuating device, the scoop being configured to move between a first open position in which the scoop extends at least in part into the fan duct and in which some of the air flow in the fan duct rushes into the scoop, and a second closed position in which the scoop is confined in the chassis and does not extend into the fan duct.

2. The propulsion assembly according to claim 1, wherein the actuating device comprises an actuating cylinder having an actuating body and a rod mechanically coupled to the actuating body, a free end of the rod being fixed to the scoop.

3. The propulsion assembly according to claim 1, wherein the actuating device comprises an actuating cylinder having an actuating body and a rod mechanically coupled to the actuating body, the rod being fixed to a cable, one end of the cable being fixed to the scoop.

4. The propulsion assembly according to claim 1, wherein the actuating device comprises a controller of the actuating device for moving the scoop between the open position and the closed position:
   the open position being adopted in order to bleed a maximum of air;
   the closed position being adopted in order not to bleed any air;
   an intermediate position between the open position and the closed position being adopted in order to achieve a partial air bleed.

5. The propulsion assembly according to claim 1, wherein the scoop comprises in succession, in a direction in which the air flows in the fan duct, an open upstream face, then a downstream side, an upper side, a lower side and two lateral sides, each lateral side joining together, first, the downstream slide and the upstream face and, second, the upper and lower sides, the lower side having an air outlet opening.

6. The propulsion assembly according to claim 5, the air intake system further comprising an air exchanger, wherein the air outlet opening is connected to the exchanger via a neck.

7. The propulsion assembly according to claim 6, wherein the air outlet opening is connected to the neck via a gaiter.

8. The propulsion assembly according to claim 5, wherein the lower side is profiled in a funnel shape of which the air outlet opening forms an outlet.

9. The propulsion assembly according to claim 5, wherein the lateral sides and the upper side are aerodynamically profiled and each in succession in the direction of the air flows have a leading edge and a trailing edge.

* * * * *